United States Patent [19]

Adell

[11] 4,379,376

[45] Apr. 12, 1983

[54] UNIVERSAL EDGE GUARD

[75] Inventor: Robert Adell, Novi, Mich.

[73] Assignee: U.S. Product Development Company, Novi, Mich.

[21] Appl. No.: 323,512

[22] Filed: Nov. 23, 1981

[51] Int. Cl.³ ................................................ B60J 5/00
[52] U.S. Cl. ........................................ 49/462; 52/716
[58] Field of Search ................................ 49/462, 460;
52/716–718; 428/126, 192

[56] References Cited

U.S. PATENT DOCUMENTS

| | | | |
|---|---|---|---|
| 2,879,104 | 3/1959 | Halladay | 49/462 |
| 2,887,338 | 5/1959 | Adell | 49/462 |
| 4,259,812 | 4/1981 | Adell | 52/716 X |
| 4,291,076 | 9/1981 | Katoh | 52/716 X |
| 4,338,148 | 7/1982 | Adell | 49/462 X |

Primary Examiner—Philip C. Kannan
Attorney, Agent, or Firm—Stephenson and Boller

[57] ABSTRACT

A universal edge guard comprises a generally U-shaped metal channel having inner and outer legs with the cross section of the channel being formed into a generally semi-circular base with beads at the ends of the inner and outer legs being inwardly offset. A pattern of notches is formed in the inner leg with the notches extending from the bead along the inner leg and into the semi-circular base terminating just slightly beyond the mid-point of the base. The pattern of notches has uniformly sized notches with the notches being equally spaced apart. The preferred pattern has the notches at about one-half inch spacing and the notches about three-sixteenths inch in width. The construction allows the edge guard to be contoured to the contour of an edge without the use of additional manufacturing procedures to conform the edge guard to the desired cross section. The edge guard may also be readily cut to length by severing at one of the notches. The preferred embodiment incorporates a vinyl insulating liner lining the interior of the channel and extending around the outside of the beads.

15 Claims, 5 Drawing Figures

UNIVERSAL EDGE GUARD

BACKGROUND AND SUMMARY OF THE INVENTION

This invention relates to ornamental and protective edge guards such as applied to the edges of sheet metal members of automotive vehicles, for example swinging closures such as doors, trunk lids, hoods, gasoline fill doors, and other members such as drip rails, bumper edges, etc.

In the case of the vehicle's doors, door edge guards are applied to the trailing edges to protect them from damage which might be caused by striking an object which may be present in a door's path when the door is opened. It is also desirable for such door edge guards to be made of bright metal such as stainless steel, aluminum, or a bimetal due to the excellent protective and ornamental character of such materials. Furthermore the inherent strength and resiliency of metallic edge guards enable them to be self-retaining on the doors. Correspondingly it is generally undesirable to use separate fasteners or adhesives in securing door edge guards to doors since they involve extra cost in labor and materials. It is also generally undesirable to use strictly non-metallic edge guards such as plastic edge guards since they do not possess the excellent protective ornamental and self-retention characteristics of bright metallic edge guards. In connection with the usage of self-retaining edge guards, it has heretofore been recognized that the potential for paint scratching and marring exists when the metal edge guards are applied to the vehicle door edges. Such paint scratching can lead to premature corrosion of the door edge metal. Some of applicant's own inventions have addressed this matter of possible paint scratching and corrosion and have provided solutions. Some of applicant's prior inventions are represented by issued U.S. Pat. Nos. 2,704,687 and 4,259,812 as well as pending patent applications Ser. Nos. 118,475; 132,525; 194,747; 194,748; 194,749; 216,483 and 216,860. Certain of these disclose the use of plastic liners to insulate the metal edge guard from the vehicle door. The liners may be extruded plastic, plastic encapsulation, foam plastic or plastic film by way of example.

In particular, reference is made to pending application Ser. No. 216,860 which contains an example of an edge guard having a laminated plastic lining with the legs of the edge guard having insulated metal beads running along the free ends of the legs and by which the retention force is applied to the door. Metal beads are particularly useful for they can provide a stiffening of the legs at the point of force application to the door while also providing a decorative feature in the case of the insulated metal construction wherein the beads are formed by outwardly reversing the ends of the legs so as to yield a band or narrow strip of the insulating liner exposed to view. The liner can be a dark plastic so that the narrow strip appears as a colored band which contrasts with the bright metal of the remaining exposed portion of the edge guard so that the overall appearance of the edge guard is particularly pleasing and/or decorative. The present invention however may be practiced with or without such liners although usage of liners is definitely preferred.

One of the important advantages of metal door edge guards of the type which applicant has invented and successfully developed is that the metal edge guards are self-retaining. This means that no separate fasteners, adhesives or extra procedures are required in order to install the edge guards on the doors. This further means that there is less possibility for corrosive action to be initiated and it means that the installation procedure is less complicated. In many instances the edge to which the edge guard is applied will have a particular contour conforming to the desired styling of the vehicle. In most instances this is other than a straight shape and the contour will have peaks and recesses at selected locations. Applicant has also heretofore invented constructions and procedures for applying self-retaining edge guards to contoured door edges which have other than a straight shape. For example notches and overbends are procedures which have been applied in order to conform the edge guard to the contour of the door edge and enhance the effectiveness of the legs of the edge guard in retaining the edge guard on the door. Attention is directed to applicant's U.S. Pat. No. 2,887,338.

The invention disclosed in applicant's co-pending application Ser. No. 323,513, filed Nov. 23, 1981, is directed to a new and improved edge guard having a new and unique cross sectional shape which provides advantages which have heretofore not been obtained with prior edge guards. Never before in applicant's thirty years of edge guard manufacture has there been an edge guard of such retention quality which can self-retain on edges of far greater irregularity. In particular that invention has resulted in improved tolerance control of the door edge guard cross section and this in turn can minimize the amount of additional procedures such as notching and overbending which otherwise might have to be applied to a door edge guard. It provides a stronger edge guard cross section with improved retention capability yet there are no extra complications of the manufacturing procedure or the installation procedure. While that invention is preferably utilized with insulated metal edge guards, it is possible for the invention to be practiced without the use of insulation if that is what is desired. The edge guard of that invention has what may be considered as basically a U-shaped cross section but there are particular details of the cross section which constitute new and unique features providing heretofore unobtained advantages.

In accordance with the principles of the invention disclosed in Ser. No. 323,513 the edge guard is provided with beads at the distal ends of the legs which are formed by outwardly reversing the metal strip of the edge guard back onto itself. The legs further include an offset whereby the point at which the beads bear against the door edge is inwardly offset. The beads themselves may be either open or closed and they may be either inwardly or outwardly reversed. In the preferred embodiment the edge guard has an insulating liner through which the force is applied to opposite sides of the edge of the object on which the edge guard is installed and the beads are turned outwardly. The base of the U-shaped cross section is basically of a semi-circular shape which merges into the offsets on opposite sides of the cross section. One advantage is that the dimension across the throat of the edge guard (i.e. the opening between the beads) can be much better controlled dimensionally from the manufacturing standpoint and yet a very strong but resiliently expansible edge guard results. By the two sides of the edge guard being symmetrical and by the bearing portions of the beads facing each other and being generally flat, but with the leading edge of each bead being rounded, installation of the edge guard on a door edge is particularly convenient, yet when installed the edge guard is very securely self-retained. A further advantage, particularly in the case of an insulated metal edge guard where the installation is applied to the full width of the metal strip from which the edge guard is formed, is that a thin band of insulation material is exposed to view where the distal end of each leg has the bead formed by turning the end of the leg outwardly. This, coupled with the offset, renders the exposed decorative band generally flush with a tangent to the region where the offset merges with the generally semi-cylindrical base of the edge guard. In this way the improved edge guard possesses various functional and decorative aspects. While the disclosed usage is as vehicle door edge guard, other usages are contemplated.

The invention of the present application is directed to an improvement upon the edge guard disclosed in applicant's co-pending application Ser. No. 323,573. The present invention possesses the attributes of that edge guard and additional ones as well. The present invention provides what may be considered as a basically universal edge guard which is readily adaptable to a range of concave and convex edge curvatures without the need to use expensive forming tools, dies and fixtures to adapt the edge guard channel to the contour of the edge. Reference is once again made to applicant's U.S. Pat. No. 2,887,338. That patent discloses a metal edge guard construction in which notches are provided in the inner leg of the metal channel at break points or sharp bends in the contour of the edge on which the edge guard is installed. While that procedure is well suited to adapting an edge guard to a particular edge, the inclusion of such notches detracts from rigidity of the edge guard in the vicinity of each notch. Hence care must be taken in handling of the edge guards to avoid bending at the notches which might render the edge guards unsuitable for use or non-compliant with an automobile manufacturer's specifications.

Another invention of applicant which is utilized to improve the retention of an edge guard on a curved edge is disclosed in his U.S. Pat. No. 2,856,229. In that patent the edge guard contour is formed to a curvature which differs somewhat from the actual curvature of the edge on which the edge guard is to be installed. In other words a certain amount of what is referred to as "overbend" is incorporated into the edge guard at the time of fabrication so that when the edge guard is installed, the overbend in conjunction with the retention force of the inner and outer legs will cooperate to retain the edge guard on the door edge.

In another respect the present invention constitutes an improvement whereby the overbending and the prior notching techniques can be dispensed with. Consequently, the invention of this application contemplates the manufacture of an edge guard to a generally U-shaped roll-formed cross section which requires no additional manufacturing processing such as notching or overbending to conform the edge guard to a particular contoured edge. Heretofore the manufacture of metal door edge guards required additional notching and/or overbending operations after roll forming in order to conform the edge guard to the desired contour of an edge on which the edge guard was to be installed. These contributed to additional expense in the manufacturing process, and as explained above in the case of notching, impaired the rigidity of the edge guard at the notches. Furthermore, once an edge guard had been manufactured to its intended contour, it was essentially impossible to readapt the edge guard to a different contour.

The present invention constitutes a major development in this field because it allows the production of edge guard material to be sold without any further manufacturing operations after roll forming yet with the ability to be conveniently installed by an automobile owner on his own car, or by automobile assembly line worker on a new car.

The invention contemplates a basic cross section as described in the aforementioned co-pending application Ser. No. 323,513 but with the inclusion of a predetermined pattern of notches extending along the full length of the inner leg of the edge guard. Because of the strength of the basic edge guard cross section, a multitude of notches may be made in the inner leg of the edge guard in a predetermined pattern without seriously impairing the retention capabilities of the edge guard. Yet at the same time the inclusion of this pattern of notches allows the edge guard to be contoured to a variety of edge contours, both concave and convex, larger radius or smaller radius, thereby making the edge guard what may be considered a basically universal edge guard. Furthermore the spacing between notches allows the basic edge guard to be sold as a length of strip which can be readily adapted to a desired length by the installer simply by breaking the edge guard at one of the notches. This can be done manually by bending the edge guard a repeated number of times to fatigue the metal or it may be done by means of a suitable tool.

It is also preferred that the edge guard incorporate a insulating liner formed as a lamination on the interior of the metal edge guard channel. The method for accomplishing this is disclosed in applicant's co-pending application Ser. No. 323,510, filing date Nov. 23, 1981. When the notches are formed in the metal the die squeezes the laminate over the edges of the notches to break the raw edges of the metal which would otherwise be left. If the edge guard is used without a laminated insulation layer then the corners of the notches should be radiused in order to eliminate sharpness in the edges. By making the spacing between the notches less than the usual width of a person's thumb or finger, risk of scratching or knicking on a notch is minimized.

The foregoing features, advantages, and benefits of the invention, along with additional ones, will be seen in the ensuing description and claims which should be considered in conjunction with the accompanying drawings. The drawings disclose a preferred embodiment of the invention according to the best mode contemplated at the present time for carrying out the invention.

DESCRIPTION OF THE PREFERRED EMBODIMENT

Figure 1:
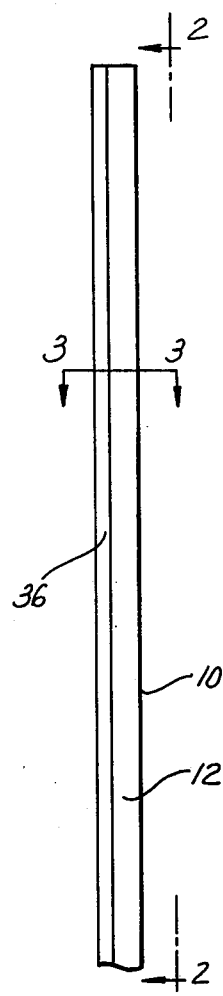
FIG. 1 is a side view of an edge guard embodying principles of the invention and showing the outer leg.

The drawings illustrate an edge guard 10 embodying principles of the present invention. The illustrated embodiment of edge guard comprises a metal channel 12 and an insulating liner 14. The insulating liner 14 is a plastic such as vinyl which is applied in surface-to-surface contact with the full surface of one side of the metal strip from which the channel 12 is formed. Details of this fabrication procedure are disclosed in certain of applicant's pending applications referred to above. The resultant construction has insulated metal beads 16 and 18 respectively at the distal ends of the outer and inner legs. The edge guard cross section may be basically considered as a U-shape having inner and outer legs with a common base; however as explained in the aforementioned patent application Ser. No. 323,513 the particular details of the edge guard cross section provide new and unique structural features obtaining heretofore unavailable benefits in an edge guard.

The edge guard is formed into the illustrated cross sectional shape through roll forming procedures and this shape may be considered as constituting a generally semi-circular segment 20 constituting the base of the U. In using this as well as the ensuing terminology, it will be appreciated that such terminology is intended to be construed by way of illustration and not by way of limitation. The cross section continues from the diametrically opposite ends of the semi-circular base section 20 as contoured inward offset segments 22 for the inner leg and 24 for the outer leg. Alternatively the segments 20, 22 and 24 could be considered as a segment by itself having an extent of somewhat more than a semi-circle. While these segments 22 and 24 are of an approximately circular contour, it is not absolutely essential that they have such circular contour and hence the contour could be more straight than is shown, or sharper than is shown. Viewed another way the legs of the cross section could be considered as extending part way into opposite sides of the base 20.

The cross section continues further from the two offset segments 22, 24 as segments 26 for the inner leg and 28 for the outer leg. The segments 26, 28 are also essentially curved with their centers of curvature being exterior of the cross section. These segments in turn merge into generally straight segments 30 for the inner leg and 32 for the outer leg. These segments 30 and 32 also constitute a part of the respective beads 18 and 16. In use, the self-retention force of the edge guard on the edge of an object is applied through these segments 30 and 32 via the insulating liner which overlies these segments bearing against the edge on opposite sides.

The beads 16 and 18 are formed by outwardly reversing the extreme distal margins of the legs 180°. Of course other reversal procedures may be employed and the beads may be open rather than closed, as illustrated in the drawing figure.

One of the advantages of this cross section is that it has substantial strength yet can be readily applied to the edge of an object and when installed will exert a substantial retention force. The exact reason for this unique attribute is not known; however, it is believed to be developed through the inclusion of the offsets, the beaded legs and the semi-circumferential span at the base of the U. A still further attribute is that in actual manufacture the dimension across the throat, or opening, of the edge guard, indicated by the reference numeral 34, can be more precisely controlled. Because of the strength of the cross section and its resistance to collapse the opening should remain at the desired dimension when it comes time to install the edge guard on the door even though the edge guard has been subjected to handling procedures in shipment. The invention permits the use of lighter and cheaper metal with lighter gage increasing the yield per pound of metal and saving the consumer money.

The resistance of the cross section to collapse is dramatically demonstrated if one were to attempt to apply a force to the beads urging the beads together. The dimension 34 is set to accommodate the minimum thickness of door edge which would be anticipated, yet in the other direction where larger door thicknesses are involved, the cross section can readily expand to accommodate those increased edge thicknesses. Irrespective of the thickness of a particular edge within the specified tolerance, excellent retention characteristics are obtained yet the edge guard possesses surprisingly remarkable attributes.

A further attribute of the illustrated cross section is that the outwardly turned bead 16 on the outer leg has exposed insulation visible to an observer as indicated by the reference numeral 36. The outside of the edge guard bead is approximately flush with a tangent line to the semi-circular segment 20 as indicated by the broken line designated by the reference numeral 38. Thus the outer bead may be considered as being offset inwardly along the leg of the edge guard so that the visible exposed portion of the bead is generally flush with a tangent line to a more proximal portion such as at a point indicated by the reference numeral 40. Where the bead includes insulation as in this example, a particularly attractive appearance results with the insulation being substantially flush with the remainder of the outer leg. The insulation, by way of example, may be a vinyl plastic which has been laminated to the metal strip before roll forming and may be of a dark color such as black, brown or navy. The advantage of using a dark vinyl material is that discoloration due to aging does not pose a problem as it does with a transparent or other types of plastic which might be subject to such undesirable features as yellowing and the like due to ultra-violet light and/or ozone.

Figure 3:
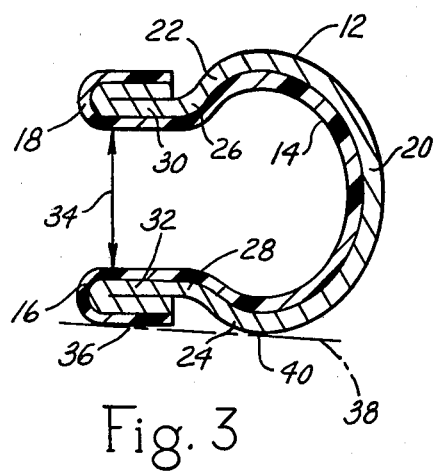
FIG. 3 is a cross sectional view taken in the direction of arrows 3—3 in FIG. 1 and enlarged.
Figure 4:
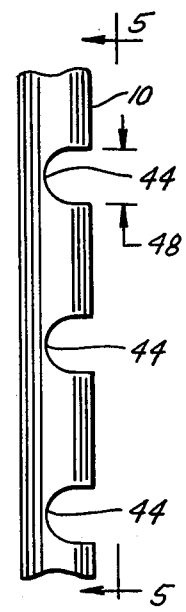
FIG. 4 is a fragmentary view on an enlarged scale in circle 4 of FIG. 2.
Figure 5:
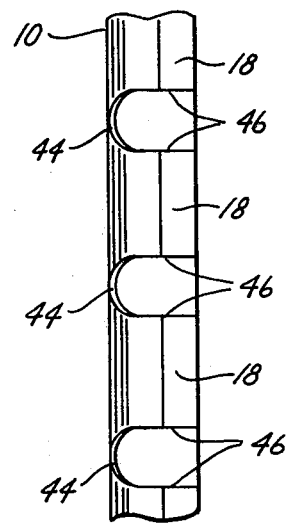
FIG. 5 is a view taken in the direction of arrows 5—5 in FIG. 4.

The basic cross section as shown in FIG. 3 has one half of the edge guard essentially symmetric with respect to the other half of the edge guard. However, in accordance with the improvement afforded by the invention of this application, the inner leg of the edge guard is provided with a pattern of individual notches 42. The notches 42 are essentially identical and each notch extends from the distal end of and along the inner leg and toward and into the base of the U. Specifically, the example shown in FIGS. 4 and 5 has the notches extending just slightly beyond the mid-point of the semi-circular segment 20 at which location the notches terminate in a rounded edge identified by the reference numeral 44. Although such is the preferred termination, it will be appreciated that the invention contemplates that the termination of the notches may be at other locations relative to the edge guard cross section. The shape of each notch is such that it extends as spaced parallel side edges 46 from the rounded terminal edge 44. As can perhaps be best seen in FIG. 5 the notches are such that the beads and the inner legs are interrupted at each notch location. However the width of each notch as indicated by the reference numeral 48 in FIG. 4 is relatively small. Furthermore the notches are established at uniform spacing intervals which by way of example are on the order of perhaps 3 to 5 times the width of an individual notch. Accordingly for a notch having a width of say three-sixteenths inch, the spacing between notches may be approximately one half inch. The widths of the notches, as well as the particular shapes of the notches, are subject to some variation if desired. Where the width of the notches decreases the spacing between notches may also decrease. Correspondingly where the width of the notches increases so can the spacing between the notches. For a one-quarter inch width, the spacing may be five-eighths inch. However, these are simply indicated by way of example and should not be construed as imposing a limitation on the scope of the invention.

The notches are preferrably formed in the laminated strip of metal and insulation prior to roll forming, for example by punching. The punching die serves to compress the vinyl insulation around the edge of the notch during cutting thereby tending to break the otherwise sharp raw edge of each notch.

Figure 2:
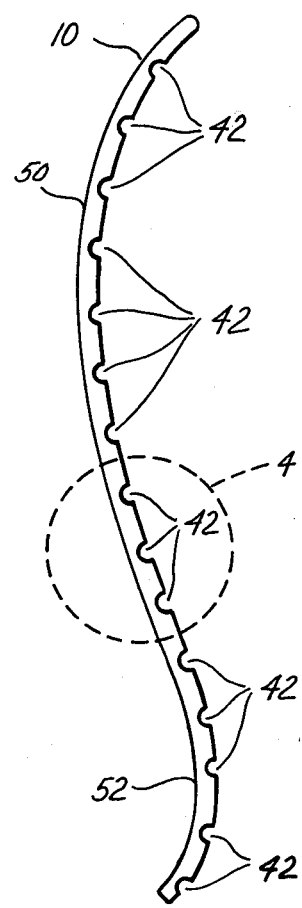
FIG. 2 is a view taken in the direction of arrows 2—2 in FIG. 1.

By restricting the overall size of the notches the strength of the basic cross sectional shape of FIG. 3 is not impaired insofar as its retention force and installability on an edge are concerned. To the contrary the inclusion of the notch pattern imparts a versatility to the edge guard which can eliminate certain procedures heretofore required in the manufacture of edge guards so as to render the edge guard, as roll-formed, suitable for use with variously contoured edges without subsequent steps in the manufacturing process. Looking for the moment at FIG. 2 the reader will perceive that the edge guard 10 has been formed into a contoured shape having when viewed from the left in FIG. 2 a convex contoured portion 50 toward the top of the edge guard and a concave contoured portion 52 near the bottom of the edge guard. In the convex contour portion 50 the edges 46 of the notches 42 are displaced more closely together whereas in the concave contoured portion 52 the edges 46 are moved further apart. The provision of the notches readily allows the edge guard to be conformed to various convex and and concave contoured edges which are disposed in basically a common plane such as in the plane of the paper for FIG. 2. There is a certain limited amount of curvature capability in the transverse plane (i.e. in the plane of FIG. 1). Where an edge has a compound contour in two planes, the edge guard can be made into a number of individual separate segments, each approximating a curvature in a single plane.

A still further advantage of the invention, in addition to the capability of matching the edge guard to the contour of an edge, is that the edge guard can be readily cut to any desired length simply by breaking the edge guard at one of the notches. This can be done by simply grasping the edge guard and bending it back and forth several times at a notch; alternatively the cutting may be done by a suitable tool. When the edge guard is contoured to a curved edge, there may be some distortion in the basic cross sectional shape of FIG. 3 although such distortion will be small and will not impair the effectiveness of installation and retention of the edge guard on the curved edge.

In an example of preferred use of the invention, the edge guard is installed on a door edge with the outer leg on the outside. Consequently it is the outer leg which is exposed to view and the inner leg will not be seen while the door is closed.

While a preferred embodiment of the invention has been disclosed, it will be appreciated that other embodiments are contemplated within the scope of the following claims.

What is claimed is:

1. In an edge guard of the type comprising a metal strip formed into a generally U-shaped cross section having inner and outer legs and beads at the distal ends of the legs via which the edge guard is self-retained on the edge of an object when installed thereon, the improvement wherein the U-shaped cross section has a generally semi-circularly contoured base and includes inward offsets joining the ends of the base with each bead so that the beads are disposed in inwardly off-set relation to the diametrically opposite ends of the generally semi-circularly contoured base and including a pattern of notches spaced at intervals along the length of the inner leg, said notches extending from the distal end of the inner leg, along the inner leg, and into the generally semi-circular base.

2. The improvement set forth in claim 1 wherein the notches are identical in shape.

3. The improvement set forth in claim 1 wherein the spacing between notches is uniform.

4. The improvement set forth in claim 1 wherein the notches extend just slightly beyond the midpoint of the base.

5. The improvement set forth in claim 4 wherein the notches have spaced parallel edges extending from the distal end of the inner leg and terminating in a curved edge.

6. The improvement set forth in claim 4 wherein the notches are located at approximately one-half inch intervals and the distance across each notch between the parallel edges is about three-sixteenths inch.

7. The improvement set forth in claim 1 wherein the beads are formed by being outwardly reversed.

8. The improvement set forth in claim 7 wherein the beads are closed.

9. The improvement set forth in claim 1 wherein the edge guard includes an insulating liner lining the interior of the U-shaped cross section to insulate the metal of the edge guard from the edge of an object on which the edge guard is to be installed.

10. The improvement set forth in claim 9 wherein the insulating liner is adhered in surface-to-surface contact with the interior of the U-shaped cross section.

11. The improvement set forth in claim 10 in which the insulating liner is adhered to the full width of one surface of the metal strip from which the metal edge guard is formed and the beads are formed by outwardly reversing the distal end margins of the strip so that the insulating liner covers the exterior portion of the beads to provide a band of insulation running lengthwise at the distal end of each leg on the exterior of the cross section.

12. The improvement set forth in claim 11 wherein the notches are formed after the insulating liner has been applied to the metal strip.

13. The improvement set forth in claim 1 wherein one side of the edge guard is symmetric with respect to the other side in a transverse cross section taken between notches.

14. The method of making an edge guard of the type comprising a metal strip formed into a generally U-shaped cross section having inner and outer legs comprising forming a series of longitudinally spaced notches along one side of the metal strip and then roll forming the metal strip into the U-shaped cross section having a generally semi-circular base with the distal ends of the legs being provided with beads which are inwardly offset relative to the ends of the base.

15. The method set forth in claim 14 including the step of applying an insulating layer to the side of the strip which becomes the interior of the edge guard, the notches being formed in the insulating layer as well as in the metal strip.

* * * * *

UNITED STATES PATENT AND TRADEMARK OFFICE
CERTIFICATE OF CORRECTION

PATENT NO. : 4,379,376
DATED : April 12, 1983
INVENTOR(S) : Robert Adell

It is certified that error appears in the above-identified patent and that said Letters Patent is hereby corrected as shown below:

Column 3, line 19, "323,573" should read -- 323,513 --.

Column 4, line 9, between "by" and "automobile" insert -- an --

Signed and Sealed this

Third Day of July 1984

[SEAL]

Attest:

GERALD J. MOSSINGHOFF

Attesting Officer

Commissioner of Patents and Trademarks